Figure 1:
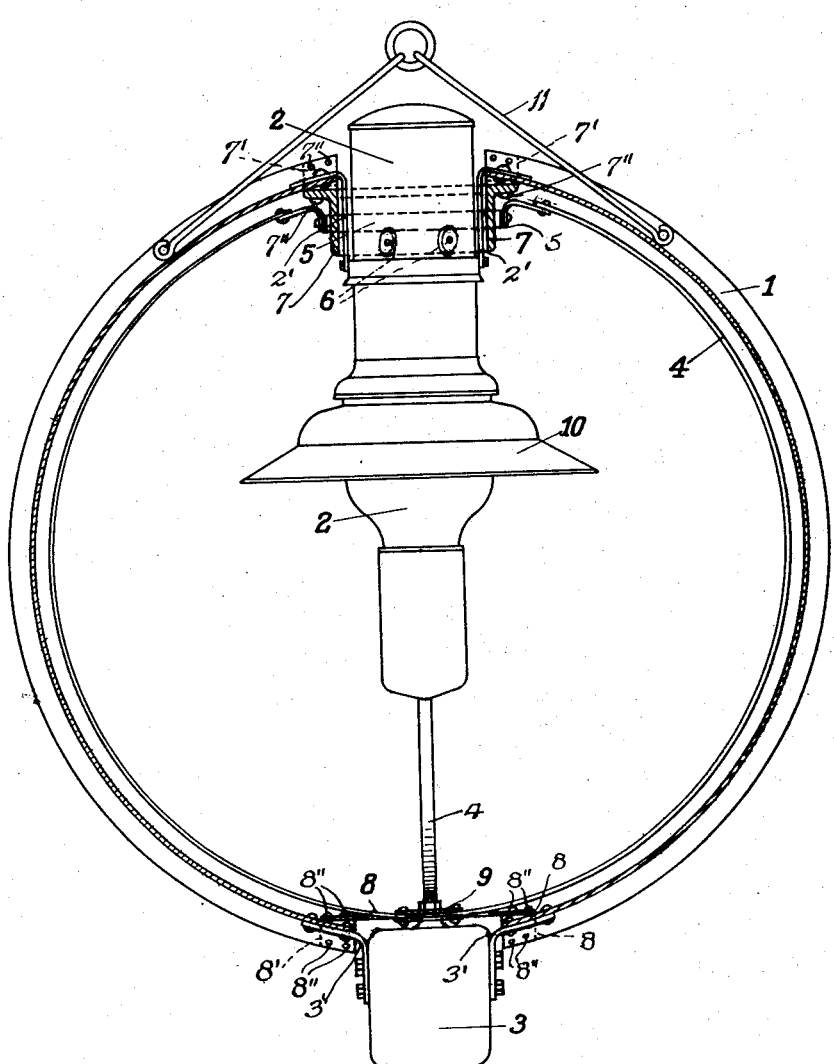

July 28, 1931. E. OPPENLÄNDER 1,816,396
COMBINED INSECT CATCHING LAMP AND KILLING DEVICE
Filed Nov. 19, 1928 2 Sheets-Sheet 1

Inventor:
Emil Oppenländer
by Paul E. Schilling
attorney

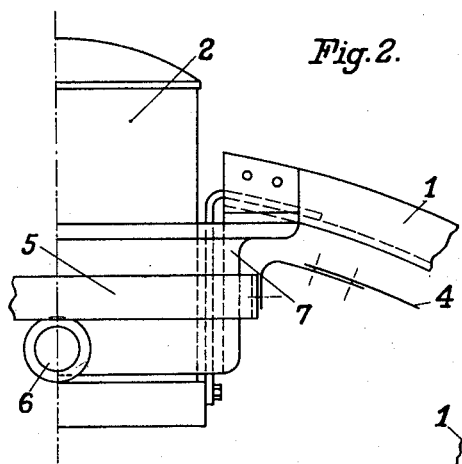
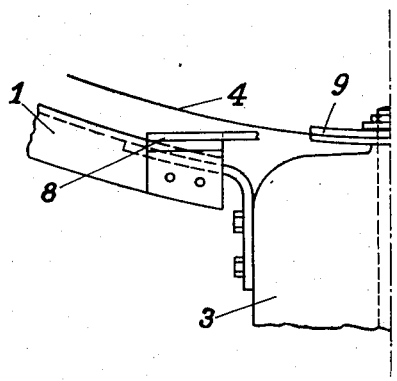
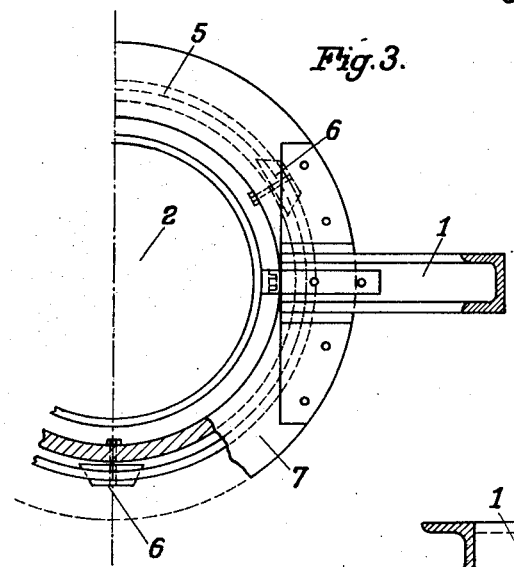
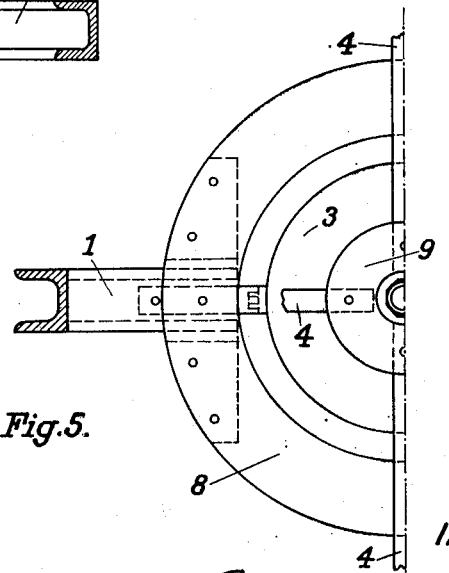

Patented July 28, 1931

1,816,396

UNITED STATES PATENT OFFICE

EMIL OPPENLÄNDER, OF WAIBLINGEN, NEAR STUTTGART, GERMANY

COMBINED INSECT CATCHING LAMP AND KILLING DEVICE

Application filed November 19, 1928, Serial No. 320,499, and in the Netherlands November 29, 1927.

My invention relates to an apparatus for doing away with flying noxious insects by means of an attracting or decoying lamp and a rotatory killing device combined with said lamp. This device consists of a quickly rotating multi-armed striker, by the blows of which the insects are killed.

I am aware of the fact that attracting or decoying lamps have already been used in connection with a rotating propeller producing an air current by which the insects arriving at said lamp are sucked into a collecting vessel, the conditions being such that but few insects are hit by the blades of the propeller. An arrangement and combination of parts of this kind is very deficient. The air duct is likely to get obstructed and must, therefore, be continually watched, and many of the insects flying towards the lamp and its light are frightened away by the streaming air before being drawn into the air stream, whereby the effect of the catching apparatus is sometimes greatly diminished.

The object of the present invention is to obviate such objections to prior devices, and this object is attained without the use of an air current, as well as without the necessity of watching the catching apparatus in order to keep it in proper working condition. Increasing the flying speed of the insects by an air current, whereby they are caused to miss the catching or destroying agent is obviated, and the rotatory speed of the striker mentioned is so determined that practically all insects are encountered and hit by its arms, and killed thereby.

As it is, in order to attain the maximum effect, important to have the striker arms exert their effect around the entire circumference of the lamp, and in all directions, I prefer to make use of particularly designed constructional forms thereof which are particularly suited for the purpose in view and embodying segmentally curved or bowed striker arms surrounding and enclosing the lamp which is arranged in the center thereof. A quickly rotated device of this kind is very much more effective than a single-armed striker, as it is active in every part of the near neighbourhood of the lamp, on all sides, at the top, at the bottom, in fact, everywhere.

The excellent effect of an insect catching and killing apparatus of the above-mentioned description can, in fact, be still more intensified by providing a practically dark zone in the upper part of the globe formed by the rotating members, in that a suitably arranged shade or the like prevents the rays of light from illuminating also said upper part. It is known from experience that some insects dazzled by the intense light of the lamp seek refuge in a dark place, but when entering into, or having arrived in, the said artificially provided dark zone, the respective insects are also then struck by the quickly rotating members and killed.

The invention is illustrated diagrammatically and by way of example on the accompanying drawings, on which Figure 1 is a side-view, partly in section, of the complete apparatus; Figure 2 shows the righthand half of the uppermost part of the apparatus, drawn to an enlarged scale; Figure 3 is a plan of the parts shown in Fig. 2; Figure 4 shows some details of the lowermost portion of the apparatus also drawn to an enlarged scale and Figure 5 is a plan of the parts shown in Fig. 4.

On the drawings, 1 denotes a two-part ring formed of two U-profiled members which is suspended from an eye (or the like) by intermediate members 11 of any desired description. These half-circles 1 are secured above and below respectively to a sleeve 7 and a stiffening ring 8 by means of angle irons 7', 8' and rivets 7'', 8'', so that a rigid circular frame is formed (supporting annulus). From the uppermost portion of the ring 1 is suspended a high-intensity lamp 2, by means of iron brackets 2', and from the lowermost portion of said ring is suspended an electromotor 3. The vertical shaft of this motor projects at the top face of the same and is there firmly connected with semicircular members 4, of wire or steel band material, which are so arranged as to form the four arms of a cross when looked at from above (see Fig. 5).

The upper ends of the members 4 are connected with one another by a rotatory ring 5 supported by three equally spaced apart rollers 6 of preferably tapered form (Fig. 3) carried by a ring 7 of angular cross-section by which the halves of the main ring 1 are firmly connected with one another. Said ring 7 can be termed the upper pole ring, and also a lower pole ring 8 is provided which connects the halves 1 with one another at their lower ends. The parts 1, 7 and 8 form, thus, a rigid structure. The lower ends of the rotating striker members 4 are clamped fast between two disks 9 by which said members are firmly connected with the motor shaft so that they can be, and are, quickly rotated by it. As the members 4 are subject to centrifugal action, a vertical component tending to press the ring 5 upon the rolls 6 is produced thereby, but this is prevented by the tapered rollers 6 which automatically center the ring 5. A narrow gap is left between the rings 5 and 7 so that the ring 5 cannot slide and rub on the ring 7 when the members 4 are rotating. The power necessary to rotate the striker is, therefore, very small, and the apparatus will remain in proper working order even if it should be subjected to somewhat strong shocks due to rough treatment or gusts of wind, or other causes.

The entire arrangement and combination of parts, including the lamp and the motor, is self-contained and can be easily transported; it may be suspended at any suitable place and from any suitable member, for instance, from a pole or a girder, etc. Wherever it may be, the insects flying towards the lamp into the sphere described by the rotating striker encounter the striker arms and are killed thereby.

In order to increase the effect of the device, a shade 10 is provided for the lamp, whereby the otherwise upwardly emitted rays of light are intercepted and a dark zone is, consequently, formed above the plane of said shade. Also this feature has already been mentioned in the introductory part of the specification, and reference is here made to the explanation there given as to the final effect of the said shade.

I claim:

1. In an insect destroying device, an annular frame, a luminous lure arranged so as to be surrounded by the frame, and a striker supported by the frame for rotation about the lure for destroying insects attracted by and flying toward the lure.

2. In an insect destroying device, the combination of an annular frame, a support arranged at the upper portion of the frame and depending into the space bounded thereby, a luminous lure carried by said support, a striker rotatably mounted for movement about the lure to destroy insects attracted by and flying toward the lure, and a motor at the base of the frame for rotating said striker, 3. In an insect destroying device, supporting means, a luminous lure carried by the supporting means, a striker arranged to rotate about the lure, and a shield arranged to intercept the rays and to provide a darkened area in the path of rotation of the striker at one side of the lure.

4. In an insect destroying device, an annular supporting frame, a support mounted at the top of the frame and depending into the space bounded by the frame, a lure lamp carried by said support, a striker rotating in the frame about the lamp for destroying insects attracted by and flying toward the lamp, and means arranged above the lamp between the same and the top of the frame for producing a darkened area in one portion of the space within the path of rotation of the striker.

5. In an insect destroying device, an annular frame, means for suspending the frame, a support at the top of the frame depending into the space bounded thereby, a lamp carried by said support, a striker mounted on the frame for rotation about the lamp to destroy insects attracted by and flying toward the lamp, and a motor at the base of the frame for rotating the striker.

6. In an insect destroying device, an annular frame, suspending means at the top of the frame, a lamp supported from the top of the frame and depending into the space bounded by the frame, a striker rotating in the frame and about the lamp for destroying insects attracted by and flying toward the same, and a motor at the base of the frame for driving said striker.

7. In an insect destroying device, an annular frame, means for suspending the frame from a support, a hanger at the top of the frame and depending into the space bounded thereby, a lamp carried by said hanger and disposed substantially centrally in said space, a shield carried by the hanger and surmounting the lamp to produce a darkened area in the frame space above the lamp, a striker mounted on the frame to rotate about the lamp and destroy insects attracted by and flying toward the lamp, and a motor at the base of the frame for driving said striker.

In testimony whereof I affix my signature.

EMIL OPPENLÄNDER.